United States Patent [19]

Currie

[11] 4,028,803
[45] June 14, 1977

[54] LOCKING MECHANISM

[76] Inventor: Philip V. Currie, 19702 Sacramento Lane, Huntington Beach, Calif. 92646

[22] Filed: July 6, 1976

[21] Appl. No.: 702,418

[52] U.S. Cl. .................................. 30/321; 30/324; 16/110 R; 403/96; 273/153 R
[51] Int. Cl.² ......................................... B26B 1/04
[58] Field of Search ............ 30/142, 171, 161, 324, 30/327, 321; 403/92, 96; 192/67 P, 89 W; 273/153; 206/1.5; 16/110 R

[56] References Cited
UNITED STATES PATENTS

| 42,807 | 5/1864 | Todd | 30/321 |
|---|---|---|---|
| 208,315 | 9/1878 | Hoffmann | 30/321 |
| 2,478,026 | 8/1949 | Thorell | 30/171 X |
| 2,922,669 | 1/1960 | Hansen | 403/96 |
| 3,433,511 | 3/1969 | Frankel | 403/96 |

Primary Examiner—James L. Jones, Jr.
Assistant Examiner—J. C. Peters
Attorney, Agent, or Firm—Blakely, Sokoloff, Taylor & Zafman

[57] ABSTRACT

A locking assembly for controllably locking a first assembly to a second assembly against relative rotation about an axis. The locking assembly provides a positive angular lock at any relative angular orientation with a minimum of actuation force required. Control of the locking mechanism may vary depending upon the application of the locking mechanism.

17 Claims, 6 Drawing Figures

LOCKING MECHANISM

BACKGROUND OF THE INVENTION

1. Field of the Invention

The present invention relates to the field of locking mechanisms for controllably locking two assemblies at any relative angular position.

2. Prior Art

A great number of locking devices for controllably locking two assemblies against relative angular rotation are well known in the prior art. Such devices vary considerably depending upon the specific purposes and application of the devices. By way of example, certain devices such as gears provide coupling between two shafts in specific increments of angular orientations. Clutches, on the other hand, may retain two shafts with respect to each other at substantially any relative angular orientation.

In certain applications it is desired to have a simple locking device which may be actuated with a minimum of force and which will lock the respective assemblies at any relative angular orientation. In this regard gear or toothed assemblies provide locking only at specific angular increments, and clutch assemblies are generally relatively mechanically complicated and require substantial actuating force or energy for actuation thereof. Because of the desire for actuation of such mechanisms with the minimum of actuation force, most mechanisms for locking two assemblies against relative angular motion are assemblies providing the desired locking only at specific relative angular orientations between the two assemblies. By way of example, U.S. Pat. No. 2,701,432 discloses a simplified indexing grinding fixture having a simple longitudinally extending pin for engaging any one of a plurality of circumferentially disposed holes in an indexing disc. Another form of indexing device for machine tools is shown in U.S. Pat. No. 2,711,324.

A number of locking devices have been applied to eating utensils such as spoons to provide free rotation of the utensil portion with respect to the handle portion under certain conditions and the locking of the two portions under other conditions. By way of example, in U.S. Pat. No. 2,636,266 a spoon having a rotatable handle is disclosed wherein the spoon becomes locked to the handle at any of a specific plurality of angular orientations under certain conditions and becomes unlocked when the spoon portion is weighted with food. Similarly, in U.S. Pat. No. 2,741,027, infants' spoons are disclosed wherein the utensil portion becomes locked to the handle portion at any of a specific plurality of angular orientations when the assembly is subjected to an axial force.

Another locking device, specifically for a chipping hammer, is disclosed in U.S. Pat. No. 2,429,728, and spoons having a provision for relative angular rotation between the utensil portion and the handle portion are disclosed in U.S. Pat. Nos. 2,682,705 and 2,809,426.

One controllable angular locking device for a power take-off on a marine diesel engine is disclosed in U.S. Pat. No. 3,643,642. In that device one member is provided with a plurality of holes or openings distributed at a radius about an axis of rotation of the assembly. A second member contains a plurality of engaging pins equal in number to the openings in the first member and spaced at the same radius so as to be engageable with the openings in the first member dependent upon the relative axial position between the two members. It will be noted in this assembly that the locking of the two members against relative angular rotation is achieved by the simultaneous engagement of all pins on the second member into all openings in the first member, thereby providing locking against relative angular rotation at a specific number of angular orientations equal in number to the number of pins (or openings) in one of the members.

In addition to the foregoing prior art, devices actuated by the rolling of one or more balls are disclosed in U.S. Pat. Nos. 1,393,312 and 2,950,365, the devices in these two patents being in the form of switches sensitive to the orientation of the devices.

BRIEF SUMMARY OF THE INVENTION

A locking mechanism for controllably locking a first assembly to a second assembly against relative rotation about an axis. A first member is rotationally coupled to the first assembly and has a first plurality of openings distributed about the axis. A second member is rotationally coupled to the second assembly and has a second plurality of openings, also distributed about the axis, the second plurality of openings being different in number from the first plurality of openings. A plurality of locking members are disposed in the openings of one of the first and second members and controllably extendable into engagement with the openings in the other of the first and second members. By making the number of openings in the first and second members different by one and selecting the proportion and taper on the end of the locking members, locking of the first and second assemblies at any relative angular position may be achieved. Control of the locking mechanism may vary depending upon the application of the locking mechanism.

DETAILED DESCRIPTION OF THE INVENTION

Figure 1:
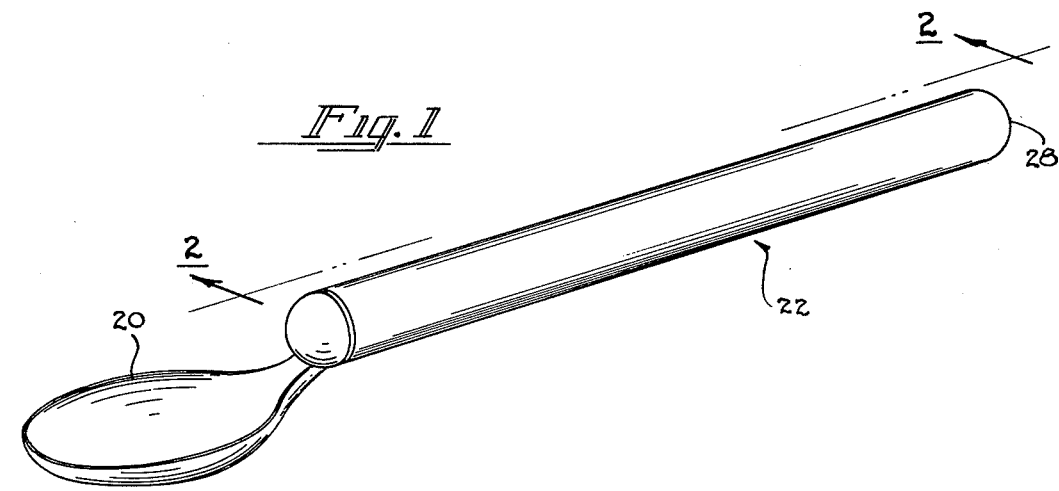
FIG. 1 is a perspective view of one embodiment of the present invention as it relates to eating utensils.

First referring to FIG. 1, a perspective view of the present invention as it may be incorporated into an eating utensil for handicapped persons, and more particularly a spoon of the stated character, may be seen. The overall assembly visible in this figure is comprised basically of a utensil portion 20 and a handle portion 22. As shall subsequently be seen, the utensil portion 20 is coupled to the handle portion 22 for relative rotation therebetween along an axis comprising the center line or axis of the handle 22. A locking mechanism is generally housed in the handle portion 22 and cooperates with a member coupled to the utensil portion 20 so as to selectively rotationally lock the handle portion and the utensil portion together. More particularly, the locking mechanism of this embodiment of the invention is resonsive to the general orientation of the handle portion 22, actuating the locking mechanism when the assembly is tilted with the utensil portion lower than the handle portion.

Figure 2:
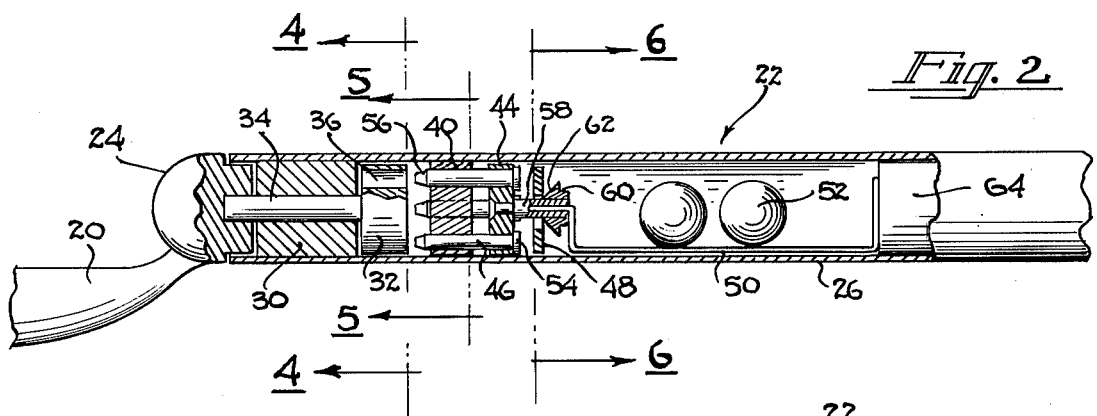
FIG. 2 is a partial cross-section taken along line 2—2 of FIG. 1.

Now referring to FIG. 2, a partial cross section taken along line 2—2 of FIG. 1 may be seen. The utensil portion 20 is coupled to a nose piece 24, forming in essence an aesthetically pleasing termination or end cap for the handle portion 22. The handle portion itself of the embodiment shown is comprised of a tubular member 26 closed at the outer end 28 thereof (see FIG. 1), and having a roller pin support 30 pressed (or otherwise attached) into the utensil end of the tubular member 26. An index wheel 32 is supported on a roller pin 34 having a press fit into the nose 24, thereby axially retaining the utensil portion 20 with respect to the handle portion 22 to allow relative rotation therebetween along the axis of the roller pin 34, generally aligned with the axis or centerline of the handle portion 22.

Figure 4:
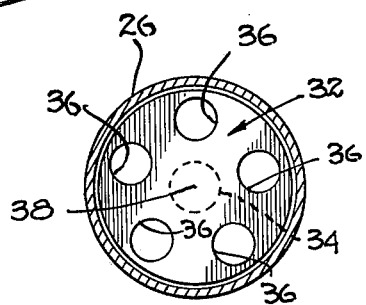
FIG. 4 is a cross-section taken along line 4—4 of FIG. 2.

The face view of the index wheel 32 may be seen in FIG 4, which is a cross section taken along line 4—4 of FIG. 2. The index wheel 32 has a plurality of openings or holes 36 therethrough, each of which has its axis substantially parallel to the center axis 38 of the index wheel, the central axis 38 also representing the axis of the handle assembly 22 and the axis of relative rotation between the handle portion 22 and the utensil portion 20 defined by roller pin 34 and the roller pin support 30. The holes 36 is the index wheel 32 are equally spaced at a predetermined radial position with respect to the central axis 38, the specific number of such openings in the preferred embodiment shown herein being five.

Figure 5:
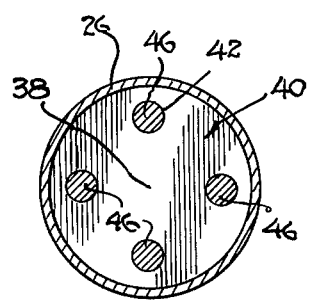
FIG. 5 is a cross-section taken along line 5—5 of FIG. 2.

Referring again to FIG. 2, it will be noted that spaced adjacent the index wheel 32 is an index set pin support 40, also pressed or otherwise fastened into the tubular member 26 of the handle portion 22 so as to be fixed with respect thereto. A face view of the index set pin support 40 may be seen in FIG. 5 which is a cross section taken along line 5—5 of FIG. 2. It will be noted that the index set pin support 40 also contains a plurality of openings or holes 42 therethrough, each also having its axis substantially parallel to the central axis 38 of the assembly and being equally spaced with the same predetermined radius as the holes or openings 36 in the index wheel 32. Further, it should be noted that the number of openings 42 in the index set pin support 40 is different from the number of openings 36 in the index wheel 32, and more particularly differs from the number of openings in the index wheel 32 by one.

Located behind the index set pin support 40 is an index set pin assembly slideably disposed within the tubular member 26 of the handle assembly 22. This assembly is comprised of a plurality of parts, more specifically an index set pin carrier 44, a plurality of set pins 46, a pin selector washer 48, an impact carriage 50 and a pair of impact balls 52. The index set pin carrier 44 contains a plurality of openings therein equally spaced at the predetermined radius of the openings in the index set pin support 40 and the index wheel 32, and equal in number to the openings in the index set pin support. Accordingly, an end view of the index set pin carrier 44 is substantially the same as the end view of the index set pin support 40 shown in FIG. 5. The set pins 46 are disposed through the openings in the index set pin carrier 40 and the index set pin support 32, each having a slightly enlarged head 54 and a generally tapered end 56 to encourage penetration of the respective end of the set pin into one of openings 36 in the index wheel 32.

The central region of the index set pin carrier 44 has a rearward extending section 58 having a central hole therethrough, with a retaining member 60 pressed thereover to entrap the pin selector washer 38 therebetween. It will be noted (see also FIG. 6) that the pin selector washer 48 has a relatively loose fit on the shaft-like protrusion 58, and that the surface 62 of the retaining member 60 is tapered (or curved) simulating an approximate section of a spherical surface so as to be capable of encouraging the pin selector washer 48 against the heads 54 of the index pins 46 regardless of the angular oreintation between the freely floating pin selector washer 48 and the retaining member 60.

The impact carriage 50 in the preferred embodiment is a simple bent wire member (alternatively a molded or formed extended plastic member) having a loop 64 at one end thereof and a pair of 180° bends at the opposite end thereof to provide a press fit into the opening or hole in the end of the shaft-like protrusion 58 on the index set pin carrier 44. The impact carriage 50 essentially entraps the pair of metal balls 52. Since the metal balls, in the preferred embodiment steel balls, (which may be stainless steel or plastic coated) are generally heavier than the index set pin assembly, the position of the index set pin assembly is responsive to the impact and weight of the metal balls 52 for motion with respect to the handle portion 22.

Figure 3:
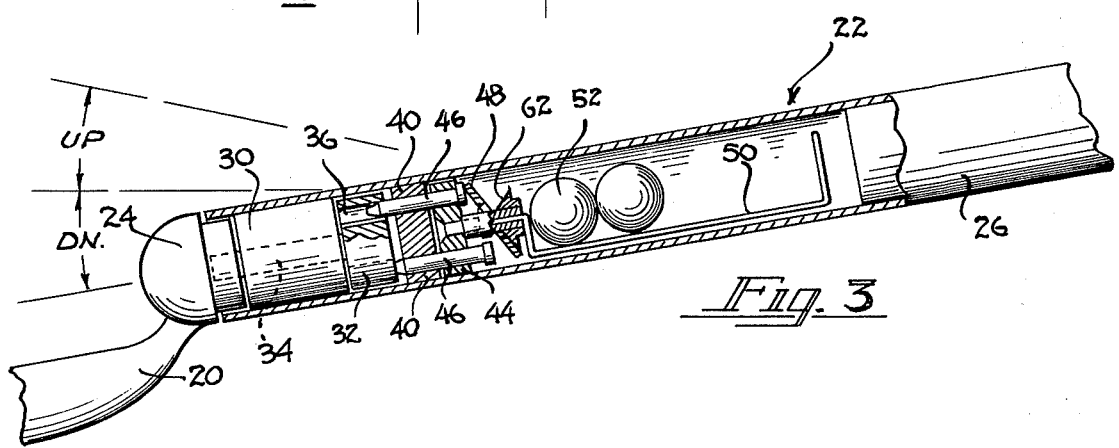
FIG. 3 is a partial cross-section similar to FIG. 2 illustrating the actuation of the locking mechanism.
Figure 6:
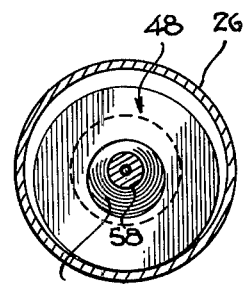
FIG. 6 is a cross-section taken along line 6—6 of FIG. 2.

As previously mentioned, the pin selector washer 48 is generally freely positioned between the heads 54 of the index pins 46 and the retainer 60 as may be seen in FIG. 6, which is a cross section taken along line 6—6 of FIG. 2. However when the assembly is tilted with the utensil portion in a lowered position as shown in FIG. 3 so that the impact balls 52 drive the index set pin assembly toward the utensil portion, the washer 48 is free to center itself on the surface 62 to apply pressure on the heads 54 of the index pins 46, and to pivot or swivel in response to the penetration of one of the pins into one of the openings 36 in the index wheel 32 as illustrated in FIG. 3. In this regard it should be noted that the size of the openings 36 in the index wheel 32 is selected in conjunction with (i), the radius about which the openings and pins are disposed; (ii), the number of pins and (iii), the extent of taper 56 at the ends of the index pins 46, so that regardless of the relative angular orientation between the index wheel 32 and the index set pin support 40, at least one pin will always at least partially penetrate an adjacent opening in the index wheel 32 to lock the assembly against relative rotation. Accordingly, the handle portion 22 and the utensil portion 20 will lock at the relative angle of rotation therebetween which existed when the assembly was first tilted as shown in FIG. 3, and will remain locked in that postion until the assembly is rotated in the opposite direction so that the impact balls 52 roll toward the opposite end of the handle portion striking the loop 64 at the end of the impact carriage 50 to encourage the index pins 46 out of engagement with the index wheel 32. The motion of the impact carriage 50 is generally limited so that the index pins 46 are never fully withdrawn from the index pin support 40, either by the end of the handle portion 22 or, as an alternate, by a stop 64 for the impact carriage 50 provided for this purpose.

It may be seen from the foregoing description that because of the different number of openings in the index set pin support 32 and the index set pin carrier 40, no two set pins 46 are simultaneously aligned with the openings in the index set pin support. More particularly, with five openings in one member and four openings in the other member, there are twenty distinct angular positions between the index set pin support 32 and the index set pin carrier 40 at which one of the set pins may pass directly into one of the openings in the index set pin support 32 as illustrated in FIG. 3. However, at any position between these twenty relative angular positions, a pair of set pins 46 will partially penetrate a pair of openings in the index set pin support 32 as a result of the size of the openings therein and the taper 56 at the end of the set pins 46, thereby still locking the assembly against relative rotation at that particular angular position irrespective of the fact that such angular position is not one of the twenty angular positions hereinbefore described. To assure locking in any such in-between position, the extent of the taper 56 is limited so as to provide a "locking taper," that is, a gradual taper which will resist pin expulsion from the index set pin support 32 in the presence of a torque about the axis of rotation of the two assemblies.

It will also be obvious from the foregoing description that the gravity-sensitive actuator, driven in substantial part by the balls 52, is but one example of an actuating mechanism which may be used to control the locking mechanism of the present invention, hydraulic actuators, solenoid actuators and the like providing additional examples of such actuating devices. In fact, substantially any control configured so as to provide control of the axial position of the set pins will be adequate for the described purpose. Thus while a preferred embodiment of the present invention has been disclosed and described in detail herein, it will be understood by those skilled in the art that various changes in form and detail may be made therein without departing from the spirit and scope of the invention.

I claim:

1. A locking mechanism for controllably locking a first assembly to a second assembly against relative rotation about an axis comprising:
    a first means rotationally coupled to said first assembly having a first plurality of openings distributed about said axis;
    a second means rotationally coupled to said second assembly, said second means having a second plurality of openings distributed about said axis, said second plurality of openings being different in number from said first plurality of openings;
    a plurality of locking members, each of said locking members being disposed in one of said openings in said second member; and
    means for selectively encouraging said locking members toward engagement with said openings in said first member.

2. The locking mechanism of claim 1 wherein said openings in said first and second means are holes parallel to said axis and, for each of said first and second members, equally spaced on a radius about said axis.

3. The locking mechanism of claim 1 wherein said second plurality differs in number from said first plurality by one.

4. The locking mechanism of claim 1 wherein said locking members are pin members each having a generally tapered end for engaging said openings in said first means.

5. The locking mechanism of claim 4 wherein said means for selectively encouraging said locking members toward engagement with said openings in said first means is a gravity sensitive means.

6. The locking mechanism of claim 4 wherein said means for selectively encouraging said locking member toward engagement with said openings in said first means comprises first and second drive means, said first drive means being disposed for selective movement along said axis, said second drive means being disposed between said first drive means and said pin members and being free to swivel with respect to said first drive means.

7. The locking mechanism of claim 6 wherein one of said first and second drive means has an approximately spherically shaped surface centered on said axis and the other of said first and second drive means has a surface for mating with said spherically shaped surface to provide the swivel therebetween.

8. The locking mechanism of claim 7 wherein said first drive means has at least one ball loosely retained thereby for axial movement, whereby said ball may encourage said first drive means into axial motion.

9. A device having a utensil portion and a handle portion and having a position sensitive rotational lock therebetween comprising:
    support means for supporting said utensil portion on said handle portion for relative rotation about an axis;
    a first means rotationally coupled to said utensil portion and having a first plurality of openings distributed about said axis;
    a second means rotationally coupled to said handle portion, said second means having a second plurality of openings distributed about said axis, said second plurality of openings being different in number from said first plurality of openings;
    a plurality of locking members, each of said locking members being disposed in one of said openings in said second member; and
    means for selectively encouraging said locking members toward engagement with said openings in said first member.

10. The device of claim 9 wherein said openings in said first and second means are holes parallel to said axis and, for each of said first and second members, equally spaced on a radius about said axis.

11. The device of claim 9 wherein said second plurality differs in number from said first plurality by one.

12. The device of claim 9 wherein said locking members are pin members each having a generally tapered end for engaging said openings in said first member.

13. The device of claim 12 wherein said means for selectively encouraging said locking members toward engagement with said first means is a gravity sensitive means.

14. The device of claim 13 wherein said means for selectively encouraging said locking member toward engagement with said openings in said first means comprises first and second drive means, said first drive means being disposed for selective movement along said axis, said second drive means being disposed between said first drive means and said pin members and being fee to swivel with respect to said first drive means, 15. The device of claim 14 where one of said first and second drive means has an approximately spherically shaped surface centered on said axis and the other of said first and second drive means has a surface for mating with said spherically shaped surface to provide the swivel therebetween.

16. The device of claim 15 wherein said first drive means has at least one ball loosely retained thereby for axial movement, whereby said ball may encourage said first drive means into axial motion.

17. The device of claim 9 wherein said axis of relative rotation between said utensil portion and said handle portion is approximately aligned with the centerline of said handle portion.

* * * * *

UNITED STATES PATENT AND TRADEMARK OFFICE
CERTIFICATE OF CORRECTION

PATENT NO. : 4,028,803
DATED : June 14, 1977
INVENTOR(S) : Philip V. Currie

It is certified that error appears in the above-identified patent and that said Letters Patent are hereby corrected as shown below:

Column 2, line 68, "resonsive" should be --responsive--.
Column 3, line 29, "is" should be --in--.
Column 6, line 63, "fee" should be --free--;

Signed and Sealed this

First Day of January 1980

[SEAL]

Attest:

SIDNEY A. DIAMOND

Attesting Officer   Commissioner of Patents and Trademarks